United States Patent
Li

(10) Patent No.: US 12,554,662 B2
(45) Date of Patent: Feb. 17, 2026

(54) PROCESSING METHOD AND ELECTRONIC DEVICE

(71) Applicant: Lenovo (Beijing) Limited, Beijing (CN)

(72) Inventor: Dong Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/639,192

(22) Filed: Apr. 18, 2024

(65) Prior Publication Data
US 2024/0394204 A1    Nov. 28, 2024

(30) Foreign Application Priority Data
May 26, 2023    (CN) .......................... 202310610060.4

(51) Int. Cl.
*G06F 13/22*    (2006.01)
(52) U.S. Cl.
CPC .......... *G06F 13/22* (2013.01); *G06F 2213/40* (2013.01)

(58) Field of Classification Search
CPC ....................................................... G06F 13/22
See application file for complete search history.

(56) References Cited

U.S. PATENT DOCUMENTS

| | | | | |
|---|---|---|---|---|
| 2008/0071940 A1* | 3/2008 | Kim | ..................... | G06K 7/0008 710/19 |
| 2016/0117268 A1* | 4/2016 | Griffin | ................... | G06F 13/102 710/10 |
| 2023/0086829 A1* | 3/2023 | Giri | ....................... | G06F 9/4401 714/15 |

* cited by examiner

*Primary Examiner* — Tim T Vo
(74) *Attorney, Agent, or Firm* — ANOVA LAW GROUP, PLLC

(57) ABSTRACT

A processing method includes obtaining an interface use status of a first module and controlling a status identifier of a first storage area to correspond to the interface use status. The first module is electrically connected to another module via an interface. The status identifier is used to support detecting a status of the first module.

20 Claims, 5 Drawing Sheets

PROCESSING METHOD AND ELECTRONIC DEVICE

CROSS-REFERENCE TO RELATED APPLICATION

The present disclosure claims priority to Chinese Patent Application No. 202310610060.4, filed on May 26, 2023, the entire content of which is incorporated herein by reference.

TECHNICAL FIELD

The present disclosure relates to the electronic technology field and, more particularly, to a processing method and an electronic device.

BACKGROUND

Based on an interface of an internal chip, an electronic device is electrically connected to electronic hardware through the interface. However, as the electronic hardware at the interface changes, the electronic device cannot be started and run properly.

SUMMARY

An aspect of the present disclosure provides a processing method. The method includes obtaining an interface use status of a first module and controlling a status identifier of a first storage area to correspond to the interface use status. The first module is electrically connected to another module via an interface. The status identifier is used to support detecting a status of the first module.

An aspect of the present disclosure provides an electronic device, including a first module and a second module. The first module is electrically connected to another module via an interface of the first module. The second module is configured to obtain an interface use status of the first module and control a status identifier of a first storage area to correspond to the interface use status. The status identifier is used to support detecting a status of the first module.

DETAILED DESCRIPTION OF THE EMBODIMENTS

The technical solution of embodiments of the present disclosure is described in detail in connection with the accompanying drawings of embodiments of the present disclosure. Described embodiments are merely some embodiments of the present disclosure, not all embodiments. Based on embodiments of the present disclosure, all other embodiments obtained by those skilled in the art without creative efforts are within the scope of the present disclosure.

In the present disclosure, relational terms such as "first" and "second" are merely used to distinguish one entity or operation from another, without necessarily implying any actual relationship or sequence between the entities or operations. Terms such as "comprising," "including," or any other variations thereof are intended to encompass non-exclusive inclusion, such that processes, methods, articles, or devices including a series of elements include not only those elements but also other elements not expressly listed or elements inherent to the processes, methods, articles, or devices. When there is no more limitation, elements defined by the phrase "comprising a . . . " do not exclude the presence of additional identical elements in the processes, methods, articles, or devices comprising the elements.

The technical solution of the present disclosure can be applied in various general- or special-purpose computing environments or configurations such as personal computers, server computers, handheld devices or portable devices, tablet devices, multiprocessor apparatuses, distributed computing environments including any of the above apparatuses or devices.

Figure 1:
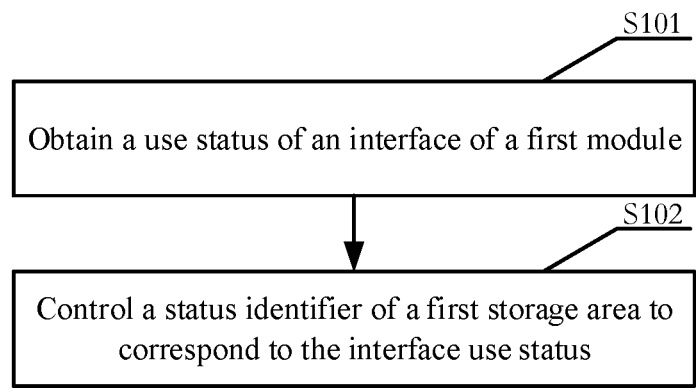
FIG. 1 illustrates a schematic flowchart of a processing method according to some embodiments of the present disclosure.

FIG. 1 illustrates a schematic flowchart of a processing method according to some embodiments of the present disclosure. The method can be applied to a controller (e.g., a control chip or I/O chip). The method includes the following steps.

At S101, a use status of an interface of a first module is obtained.

The first module can be electrically connected to other modules via the interface.

For an electronic device, hardware shown in other modules can include but is not limited to hardware other than the first module in the electronic device and hardware externally connected to the electronic device.

In some embodiments, taking a motherboard as an example, the hardware of the first module can include a Southbridge chip (Platform Controller Hub (PCH)) of the motherboard, and the hardware of other modules can include but is not limited to the Northbridge chip, the ME (Management Engine) microprocessor, and the Baseboard Management Controller (BMC).

For the first module, interfaces of the first module can be divided into first-type interfaces and second-type interfaces. Different types of interfaces can be configured to be electrically connected to the hardware of other modules with different types. In some embodiments, the first module can be connected to the hardware such as BMC and the Embedded Controller (EC) through the first type interfaces and to the hardware such as a network card and a hard drive through the second type interfaces.

In some embodiments, taking the PCH as an example of the first module, the interfaces of the PCH can include an eSPI interface and a SATA signal interface. The PCH can be electrically connected to the BMC through the eSPI interface and to the hard drive through the SATA interface. Since the BMC is often updated or plugged and unplugged while the hard drive remains unchanged, changes to the BMC can affect the use status of the interface between the BMC and the PCH. Thus, the eSPI interface can be classified as a first-type interface, and the SATA interface can be classified as a second-type interface. The use status of the interface between the BMC and the PCH can be more focused, which prevents the electronic device from being deactivated and not operating normally due to the changes to the BMC.

To obtain the use statuses of the interfaces between the hardware and the first module early or for device safety purposes, the interfaces of the first module can be pre-set with priorities. Generally, a use status of an interface with higher priority can be obtained first, while a use status of an interface with lower priority can be obtained later or not obtained under a certain case.

In some embodiments, the priority of the first-type interface can be higher than the priority of the second-type interface. In embodiments of the present disclosure, obtaining the use status of the interface of the first module can typically be regarded as obtaining the use status of the first type interface.

Figure 2:
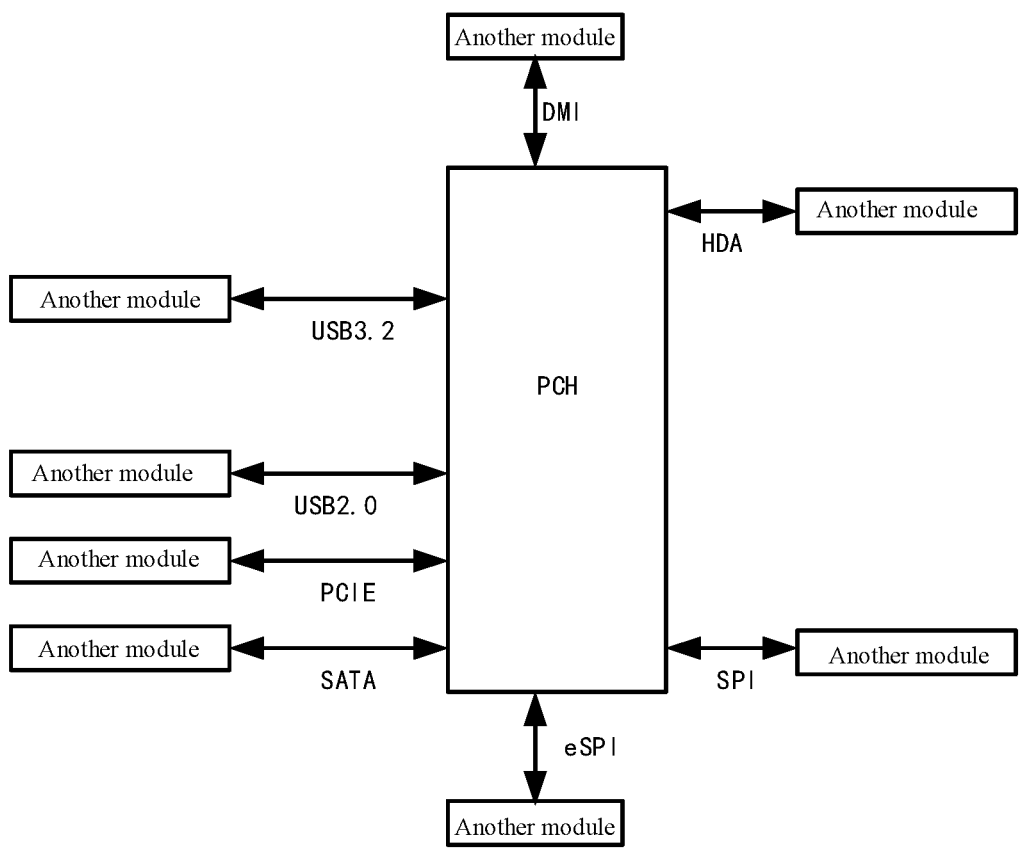
FIG. 2 illustrates a schematic diagram of a motherboard according to some embodiments of the present disclosure.

In some embodiments, taking the motherboard shown in FIG. 2 as an example, the PCH of the motherboard is used as the first module. The interfaces of the first module can include but are not limited to USB 3.2 interfaces, USB 2.0 interfaces, PCIe interfaces, SATA interfaces, eSPI interfaces, SPI interfaces, HDA interfaces, and DMI interfaces. Among them, the eSPI interfaces can be used as the first type interfaces, while the USB 3.2 interfaces, USB 2.0 interfaces, PCIe interfaces, SATA interfaces, SPI interfaces, HDA interfaces, and DMI interfaces can be used as second type interfaces. After the PCH is powered on, the use status of the eSPI interface can be obtained first as the use status of the interface of the PCH, and the use status of another interface can be subsequently obtained based on the actual situation. In addition, the eSPI interface can include a CS0 signal interface and a CS1 signal interface. That is, the CS0 signal interface and the CS1 signal interface can have the same priority, and the use status of the CS0 signal interface and the use status of the CS1 signal interface can be obtained concurrently as the use status of the interface of the PCH.

Based on the interface use status of the first module, the actual use status of another module can be determined. In some embodiments, when the interface use status is an activation status, the another module can be in an available status. When the interface use status is a non-activation status, the another module can be in an unavailable status.

In some embodiments, taking a CS1 signal interface between PCH and BMC as an example, when the interface use status is the activation status, BMC can be in the available status. That is, BMC can be successfully mounted at the electronic device where PCH belongs. BMC can be called by the electronic device through the CS1 signal interface. When the interface use status is the non-activation status, BMC can be in the unavailable status. That is, BMC can be determined to be not mounted at the electronic device where PCH belongs, or BMC cannot be called by the electronic device through the CS1 signal interface.

In some embodiments, after the electronic device is powered on, the another module can generate an electrical signal corresponding to the actual use status of the hardware of the another module. Thus, according to the electrical signal, the interface use status of the first module can be obtained.

In some embodiments, obtaining the interface use status of the first module can include obtaining a target signal, the target signal being an electrical signal sent by the another module through the interface of the first module, if the target signal is able to be obtained, determining the interface use status as the activation status, and if the target signal cannot be obtained, determining the interface use status as the non-activation status.

In some embodiments, taking the CS1 signal interface between PCH and BMC as an example, when BMC is in the available status, BMC can send the target signal through the CS1 signal interface to determine the CS1 signal interface to be in the activation status, and when BMC is in the unavailable status, BMC cannot send the target signal through the CS1 signal interface to determined the CS1 signal interface to be in the non-activation status.

In some embodiments, The another module can generate the electrical signal corresponding to the actual use status of the hardware of the another module. For example, when the actual use status of the hardware is the available status, the another module can generate a high-level signal. When the actual use status of the hardware is the unavailable status, the another module can generate a low-level signal. Thus, if the obtained target signal is the high-level signal, the interface use status can be determined to be the activation status. If the obtained target signal is the low-level signal, the interface use status can be determined to be the unavailable status.

In some embodiments, taking the CS1 signal interface between PCH and BMC as an example, when BMC is in the available status, the another module where BMC belongs can send the high-level signal through the CS1 signal interface to determine the CS1 signal interface to be in the activation status. When BMC is in the unavailable status, the another module where BMC belongs can send the low-level signal through the CS1 signal interface to determine the CS1 signal interface to be in the non-activation status.

At S102, a status identifier of a first storage area is controlled to correspond to the interface use status.

The status identifier can be used to support the detection of the status of the first module.

Controlling the status identifier of the first storage area to correspond to the interface use status can include ensuring the status identifier of the first storage area is consistent with the interface use status. That is, if the interface use status is the activation status, the status identifier of the first storage area can be controlled to be the activation status. If the interface use status is the non-activation status, the status identifier of the first storage area can be controlled to be the non-activation status.

In embodiments of the present disclosure, a plurality of implementations can be provided to control the status identifier of the first storage area to correspond to the interface use status.

In some embodiments, a backup status identifier corresponding to the interface use status can be obtained. The backup status identifier can be located in a second storage area different from the first storage area. The backup status identifier can be stored in the first storage area to cause the status identifier of the first storage area to change to the backup status identifier.

In some embodiments, the first storage area and the second storage area can be storage areas included by the same electronic device. The status identifier can be in an address in the first storage area, and the backup status identifier can be in an address in the second storage area, which can be set by those skilled in the art according to actual situations. The back status identifier can be stored in the first storage area. In some embodiments, the backup status identifier can be copied into a target address. The target address can be used to represent an address of the status identifier in the first storage area.

To ensure the safety of the backup status identifier, a storage area with high safety can be selected as the second storage area to ensure that the data of the second storage area cannot be lost randomly. An access authority can be set for the second storage area to ensure that an object with the determined access authority can access the second storage area. In addition, to prevent the backup status identifier from being modified, signature verification can be performed on the backup status identifier in advance to ensure that the backup status identifier can only be used by the object with the determined protocol.

In embodiments of the present disclosure, the backup status identifier can include a first identifier and a second identifier. In some embodiments, the first identifier can be used to represent the activation status, and the second identifier can be used to represent the non-activation status. The address of the first identifier and the address of the second identifier can be different in the second storage area.

In some embodiments, if the interface use status is the activation status, the first identifier can be obtained from the second storage area. The first identifier can be stored in the first storage area to cause the status identifier of the first storage area to be changed into the first identifier. If the interface use status is the non-activation status, a second identifier can be obtained from the second storage area. The second identifier can be stored in the first storage area to cause the status identifier of the first storage area to be changed into the second identifier.

In some embodiments, controlling the status identifier of the first storage area to correspond to the interface use status can further include, based on the correspondence between the interface use status and the status identifier, the status identifier of the first storage area can be changed to cause the corrected status identifier to correspond to the interface use status.

Since the status identifier of the first storage area needs to be modified, to ensure the safety of the status identifier, the storage area with high safety can be selected as the first storage area to ensure that the data of the first storage area cannot be changed randomly. The access authority can be set for the first storage area to ensure that only the object with the determined access authority can access the first storage area.

In some embodiments, the status identifier can be expressed based on a binary character. For example, when the status identifier is 1, the status identifier can represent the activation status. When the status identifier is 0, the status identifier can represent the non-activation status. Similarly, the interface use status can also be based on the binary character. For example, when the interface use status is 1, the interface use status can represent the activation status. When the interface use status is 0, the interface use status can represent the non-activation status.

In some embodiments, based on the binary character, if the interface use status is 1, and the status identifier of the first storage area before correction is 0, the status identifier of the first storage area can be corrected. The status identifier after correction can be 1. If the status identifier before correction is 1, the status identifier of the first storage area may not need to be corrected. The status identifier before the correction can be determined as the status identifier after the correction.

In some embodiments, if the interface use status is 0, and the status identifier of the first storage area before correction is 1, the status identifier of the first storage area can be corrected, and the status identifier after correction can be 0. If the status identifier before correction is 0, the status identifier of the first storage area may not need to be corrected. The status identifier before correction can be determined as the status identifier after correction.

The first storage area can include a first sub-area and a second sub-area. The first sub-area can be used to store the status identifier. The second sub-area can be used to store the running data of a first system. The first system can be configured to guide the second system to run. The second system can be configured to start running after the first module completes the status detection.

The running data and the status identifier of the first system can be stored separately to facilitate the control of the status identifier to improve the status detection efficiency of the first module. In some embodiments, modification events through the another module cannot be predicted and can often occur. Thus, the control behavior of the status identifier cannot be mastered. The status identifier can be used frequently. To prevent the running data of the first system from being affected, the running data and the status identifier can be stored separately.

In some embodiments, taking a motherboard as an example, assume that the first module is PCH, the hardware of the another module is BMC, the first system is a basic input-output system (BIOS), and the second system is a Windows operating system. When the uninstallation event of BMC is triggered, the interface use status can be changed to the non-activation status. Thus, the status identifier in the first sub-area may need to be controlled to set to the non-activation status. After the status identifier is controlled to correspond to the interface use status, the PCH can be triggered to perform status detection based on the status identifier. After PCH completes the status detection, BIOS can be triggered to load the running data in the second sub-area to boot the Windows operating system to start running.

When the first module performs the status detection based on the status identifier of the first storage area, if the status identifier is the activation status, the first module can send a detection signal to the another module through the interface. After the first module receives a response signal fed back by the another module based on the detection signal, the status detection can be determined to be completed successfully. If the status identifier is the non-activation status, the first module may not need to send the detection signal to the another module and can directly determine that the status detection is completed successfully.

If the interface use status is the non-activation status, and the status identifier of the first storage area is the activation status, when the first module performs the status detection, the first module can still send the detection signal to the another module through the interface. Since the interface use status is the non-activation status, the hardware of the another module can be in the unavailable status. That is, the another module cannot feed the response signal back to the first module based on the detection signal. Thus, the first module cannot receive the response signal and cannot complete the status detection. Therefore, the second system cannot run, and the normal booting and running of the electronic device can be affected. That is, if the status identifier of the first storage area is not controlled to correspond to the interface use status, the electronic device cannot start running.

In some embodiments, taking a motherboard as an example, assume that the first module is PCH, the hardware of the another module is BMC, the second system is the windows operating system, BMC is initially mounted at the motherboard and is electrically connected to PCH through the interface, and the status identifier of the first storage area is the activation status by default. After BMC cannot be mounted due to a special reason, the interface use status obtained currently can be the non-activation status. If the status identifier of the first storage area is not controlled to change to the non-activation status, PCH cannot receive the response signal fed back by the another module during the detection process. Thus, PCH cannot successfully complete the status detection to cause the Windows operating system to be unable to start running.

When the first module wants to perform the status detection based on the status identifier of the first storage area, the first module may need to be triggered to enter a power-on time sequence control status. For the method for triggering the first module to enter the power-on time sequence control status, reference can be made to the steps and description of the steps in FIG. 3.

Further, to allow an external environment to know whether the electronic device can start running normally, a warning module can be configured to transmit a corresponding notification to the external environment. In some embodiments, for the method for the warning module to transmit the corresponding notification to the external environment, reference can be made to steps and a description of the steps in FIG. 3.

Based on step S101 and step S102, when the hardware of the another module can be modified, the status identifier of the first storage area can be controlled to correspond to the interface use status to ensure that the first module can successfully complete the status detection without being impacted by the modification of the mother modules. Thus, the electronic device can be ensured to start running normally.

Figure 3:
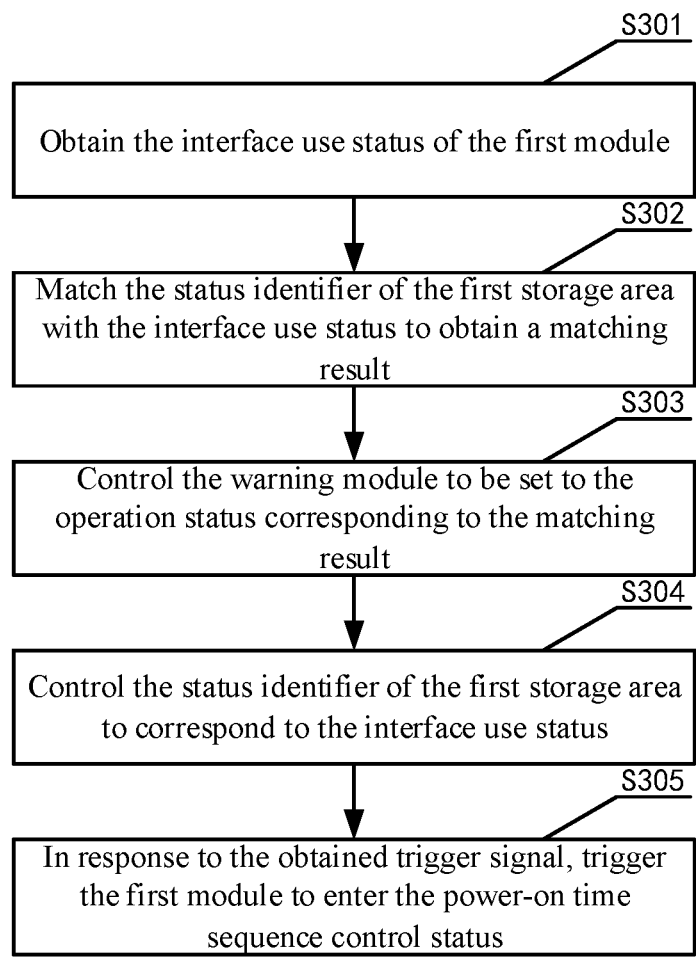
FIG. 3 illustrates a schematic flowchart of another processing method according to some embodiments of the present disclosure.

FIG. 3 illustrates a schematic flowchart of another processing method according to some embodiments of the present disclosure. The method includes the following steps.

At S301, the interface use status of the first module is obtained.

For the execution and implementation principles of S301, reference can be made to the description of S101, which is not repeated here.

At S302, the status identifier of the first storage area is matched with the interface use status to obtain a matching result.

Based on the matching result, whether the status identifier of the first storage area corresponds to the interface use status can be determined.

In some embodiments, if the matching result indicates that the status identifier matches the interface use status, the status identifier of the first storage area can be determined to correspond to the interface use status. If the matching result indicates that the status identifier does not match the interface use status, the status identifier of the first storage area can be determined to not correspond to the interface use status.

At S303, the warning module is controlled to be set to the operation status corresponding to the matching result.

The warning module can include but is not limited to an indicator and a buzzer. Based on the operation status of the warning module, the external environment can know whether the status identifier of the first storage area corresponds to the interface use status.

In some embodiments, taking the indicator as an example, if the matching result indicates that the status identifier matches the interface use status, the indicator can be controlled to be off. That is, the indicator can be controlled to be off or green to indicate that the status identifier of the first storage area corresponds to the interface use status. If the matching result indicates that the status identifier does not match the interface use status, the indicator can be controlled to be on. That is, the indicator can be controlled to be on or red to indicate that the status identifier of the first storage area does not correspond to the interface use status.

In some embodiments, taking a buzzer as an example, if the matching result indicates that the status identifier matches the interface use status, the buzzer can be controlled to be off. That is, the buzzer can be controlled to be off to indicate that the status identifier of the first storage area corresponds to the interface use status. If the matching result indicates that the status identifier does not match the interface use status, the indicator can be controlled to be on. That is, the indicator can be controlled to be on to indicate that the status identifier of the first storage area does not correspond to the interface use status.

At S304, the status identifier of the first storage area is controlled to correspond to the interface use status.

For the implementation process and principle of S304, reference can be made to the description of S102, which is not repeated here.

At S305, in response to the obtained trigger signal, the first module is triggered to enter the power-on time sequence control status.

The trigger signal of embodiments of the present disclosure can be generated based on a trigger event of a power button of the electronic device.

In some embodiments, taking a motherboard as an example, when a user presses the power button, the motherboard may need to perform a power-on time sequence task. In the power-on time sequence task, the chip (i.e., an execution body of embodiments of the present disclosure) can be controlled to response to the trigger signal to send a control signal to the first module to trigger the first module to enter the power-on time sequence control status. In the power-on time sequence control status, the first module can send a specified signal to a specified module to trigger the specified module to perform a corresponding operation (e.g., send SLP_S5 #signal to the control chip to trigger the control chip to control ATX power supply of the motherboard to operate) based on the specified signal and response to other signals to perform corresponding operations (e.g., respond to the signal sent by a voltage adjustment module to send a reset signal to CPU of the motherboard) to cause CPU to reset. After CPU resets, CPU can run a specified process (i.e., BIOS) to complete the power-on time sequence task.

When the first module is in the power-on time sequence control status, based on the requirement of the power-on time sequence task of the electronic device, the first module can autonomously perform the status detection to facilitate CPU of the electronic device to reset. After CPU resets, CPU can run the first system (i.e., BIOS) to complete the power-on time sequence task. After the power-on time sequence task is completed, CPU can boot the second system (i.e., the operating system of the electronic device) to start running based on the running data of the first system.

Taking a motherboard as an example, the control chip of the motherboard can be used as the execution body of the processes shown in FIG. 3. PCH of the motherboard can be used as the first module. After the motherboard is powered on, and the control chip controls the status identifier of the first storage area to correspond to the interface use status, the power button of the motherboard can be triggered by the external environment. The control chip can receive the trigger signal and respond to the trigger signal to trigger PCH to enter the power-on time sequence control status to facilitate PCH to perform the status detection. After PCH completes the status detection, BIOS of the motherboard can boot the operating system (e.g., the Windows operating system) of the motherboard to start running.

Based on the processes of S301 to S305, the first module can be ensured to successfully complete the status detection without being affected by the modification of the other modules to ensure the electronic device to start running normally.

To facilitate understanding of the processing method shown in FIG. 1 and FIG. 3, further description is made by taking a motherboard as an example in the present disclosure.

Assume that the first module of the motherboard is PCH, the hardware of the other modules is BMC, and BMC is electrically connected to PCH through the CS1 signal interface. The indicator of the motherboard can be used as the warning module. An EC chip of the motherboard can be used as a controller to perform the processing method shown in FIG. 1 and FIG. 3. An ME engine of the motherboard can be used as the first sub-area of the first storage area to store the status identifier. The motherboard can further include a second storage area.

Figure 4:
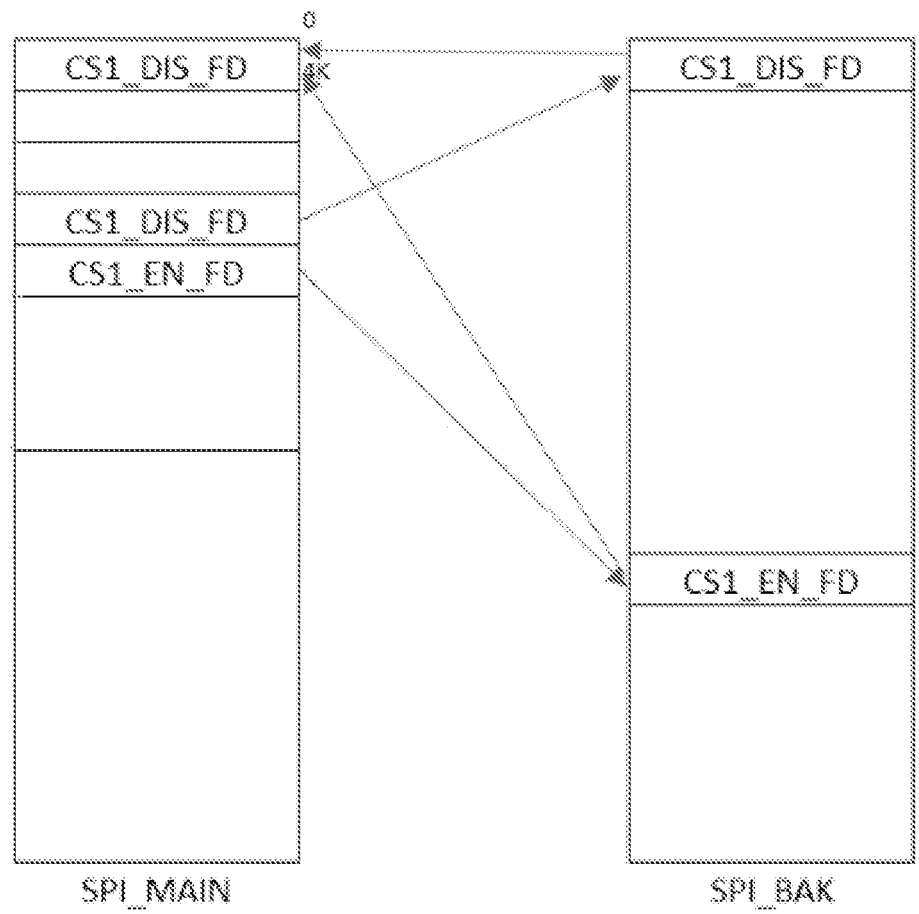
FIG. 4 illustrates a schematic diagram of data read and write according to some embodiments of the present disclosure.

In some embodiments, as shown in FIG. 4, a storage capacity taken by the status identifier of the first storage area (i.e., SPI_MAIN in FIG. 4) is 4K. The back up status identifier of the second storage area (SPI_BAK in FIG. 4) includes a first identifier (i.e., CS1_EN_FD of SPI_BAK in FIG. 4) and a second identifier (i.e., CS1_DIS_FD in FIG. 4).

In embodiments of the present disclosure, the first identifier can be obtained by the EC chip performing signature verification on the first file (i.e., CS1_EN_FD of SPI_MAIN in FIG. 4) using the specified protocol in advance. After the EC chip obtains the first identifier, the EC chip can store the first identifier in the second storage area. Similarly, the second identifier can be obtained by the EC chip performing the signature verification on the second file (i.e., CS1_DIS_FD of SPI_MAIN in FIG. 4) using the specified protocol in advance). After obtaining the second identifier, the EC chip can store the second identifier in the second storage area. Thus, the first identifier and the second identifier can only be used by the EC chip. Hardware of a third party cannot obtain the first identifier and the second identifier. Thus, the security of the back up status identifier can be effectively improved.

For the EC chip, when BMC is mounted to the motherboard through the interface of PCH, after the motherboard is powered on, the EC chip can perform the following steps.

In step 1, the interface use status of PCH is obtained. In some embodiments, the interface use status is the activation status. When BMC is mounted at the motherboard and is available for use, the EC chip can receive the target signal fed back by the other modules through the CS1 signal interface to determine the interface use status to be the activation status.

In step 2, the status identifier (the current status identifier being the activation status by default) of the first storage area is matched with the interface use status to obtain the matching result.

In step 3, the matching result is determined to indicate that the status identifier matches with the interface use status, and the indicator is controlled to be off.

In step 4, the first identifier (i.e., CS1_EN_FD) is read from the second storage area (i.e., SPI_BAK) and is copied to the first storage area (i.e., SPI_MAIN) to change the status identifier of the first storage area to the first identifier.

At step 5, in response to the obtained trigger signal (the signal of triggering the power button of the motherboard, i.e., powering on), PCH is triggered to enter the power-on time sequence control status to cause PCH to perform the status detection. After PCH completes the status detection, BIOS loads the running data to boot the operating system to start running.

In addition, when the motherboard is uninstalled, after the motherboard is powered on, the EC chip can perform the following steps.

In step 1, the interface use status of PCH is obtained. In some embodiments, the interface use status is the non-activation status. When BMC is not mounted at the motherboard, the EC chip cannot receive the target signal fed back by the other modules through the CS1 signal interface to determine that the interface use status is non-activation status.

In step 2, the status identifier (the current status identifier being the activation status by default) of the first storage area is matched with the interface use status to obtain the matching result.

In step 3, the matching result is determined to indicate that the status identifier does not match with the interface use status, and the indicator is controlled to be on.

In step 4, the second identifier (i.e., CS1_DIS_FD) is read from the second storage area and copied to the first storage area to change the status identifier of the first storage area to the second identifier.

At step 5, in response to the obtained trigger signal, PCH is triggered to enter the power-on time sequence control status to cause PCH to perform the status detection. After PCH completes the status detection, the BIOS system can load the running data to boot the operating system to start running.

Based on the scenario above, when the hardware of the other modules is modified, the status identifier of the first storage area can be controlled to correspond to the interface use status to ensure the first module to complete the status detection without being affected by the modification of the other modules to ensure the electronic device to start running normally.

Corresponding to the processing method of embodiments of the present disclosure, embodiments of the present disclosure further provide an electronic device.

Figure 5:
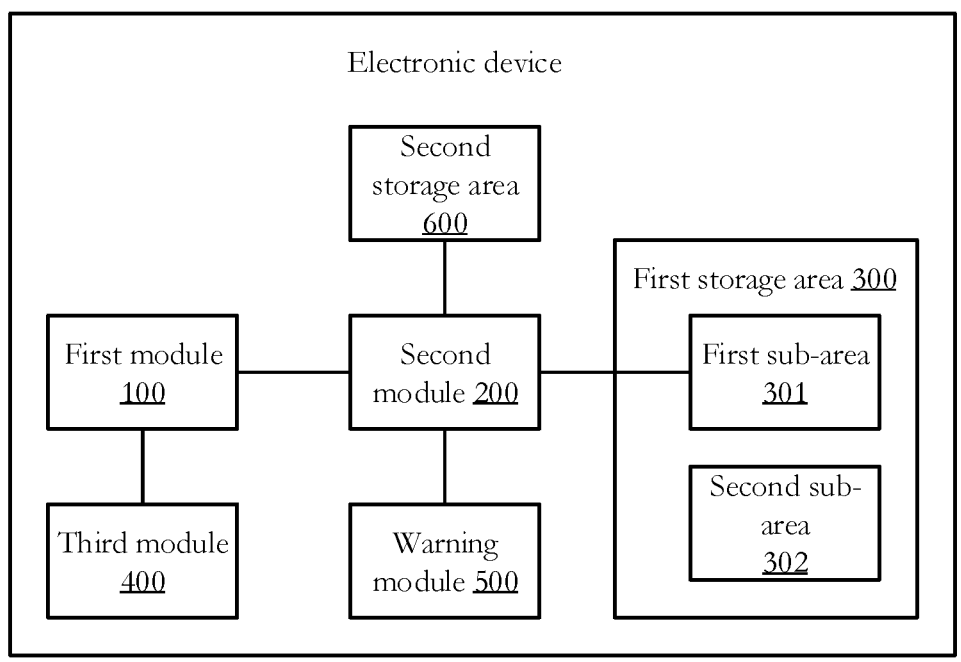
FIG. 5 illustrates a schematic architectural diagram of an electronic device according to some embodiments of the present disclosure.

FIG. 5 illustrates a schematic architectural diagram of an electronic device according to some embodiments of the present disclosure. The device includes a first module 100 and a second module 200.

The first module 100 can be electrically connected to the other modules through the interface of the first module 100.

The second module 200 can be configured to obtain the interface use status of the first module 100 and control the status identifier of the first storage area 300 to correspond to the interface use status. The status identifier can be used to support the detection of the status of the first module 100.

In the electronic device, the second module 200 can be configured to obtain the backup status identifier corresponding to the interface use status. The backup status identifier can be in the second storage area 600 different from the first storage area 300. The second module 200 can be further configured to store the backup status identifier to the first storage area 300 to cause the status identifier of the first storage area 300 to change to the backup status identifier.

In some embodiments, the second module 200 can be configured to, based on the correspondence between the interface use status and the status identifier, perform correction on the status identifier of the first storage area 300 to cause the status identifier after the correction to correspond to the interface use status.

In some embodiments, the second module 200 can be further configured to respond to the obtained trigger signal to trigger the first module 100 to enter the power-on time sequence control status.

In some embodiments, the second module 200 can be further configured to match the status identifier of the first storage area 300, and the interface use status to obtain the matching result and control the warning module 500 to be in the operation status corresponding to the matching result.

In some embodiments, the second module 200 can be further configured to obtain the target signal, the target signal being the electrical signal sent by the third module 400 through the interface of the first module 100, determine the interface use status to be the activation status in response to obtaining the target signal, and determine the interface use status to be the non-activation status in response to not obtaining the target signal.

In some embodiments, the interface of the first module 100 can include a first-type interface and a second-type interface. The first type interface can have a priority higher than the priority of the second type interface. The second module 200 can be further configured to obtain the use status of the first type interface.

The first storage area 300 can include the first sub-area 301 and the second sub-area 302. The first sub-area 301 can be configured to store the status identifier. The second sub-area 302 can be configured to store the running data of the first system. The first system can be configured to boot the second system to run.

The third module 400 can be electrically connected to the first module 100 through the interface and can be configured to obtain the data related to the running status of the electronic device.

The warning module 500 can be configured to prompt the matching result.

Based on the above assembly, when the hardware of the other modules is modified, the status identifier of the first storage area can be controlled to correspond to the interface use status to ensure the first module completes the status detection without being affected by the modification of the other modules to ensure the electronic device to start running normally.

In addition, at least some of the functions of embodiments of the present disclosure can be executed by one or more hardware logic components. For example, but not limited to, exemplary types of hardware logic components that can be used can include Field-Programmable Gate Arrays (FP-GAs), Application-Specific Integrated Circuits (ASICs), Application-Specific Standard Products (ASSPs), System-on-Chips (SOCs), Complex Programmable Logic Devices (CPLDs), etc.

Although languages specific to structural features and/or method logical actions have been used to describe the present disclosure, the subject limited in the appended claims is not limited to the above features or actions. On the contrary, the described features and actions are merely examples for implementing the claims.

Although details are described in the present specification, these details should not be considered to limit the scope of the present disclosure. Some features described in a single embodiment of the present disclosure can be combined to be implemented in a single embodiment. On the contrary, features described in the single embodiment can be implemented in a plurality of embodiments individually or in any appropriate sub-combinations.

The above is the description for some embodiments of the present disclosure and the technical principles used in the present disclosure. Those skilled in the art should understand that the scope of the present disclosure is not limited to the technical solution formed by a specific combination of the technical features, and also covers other technical solutions formed by arbitrarily combining the above technical features or equivalent features of the above technical features. For example, the technical solution formed by performing mutual replacement on the above features and the technical features (but not limited to) with similar functions of the present disclosure.

What is claimed is:

1. A processing method comprising:
    obtaining an interface use status of a first module, the interface use status being one of an activation status and a non-activation status, the first module being electrically connected to another module via an interface, wherein the activation status corresponds to the another module being in an available status and the non-activation status corresponds to the another module being in an unavailable status; and
    controlling a status identifier of a first storage area to correspond to the interface use status, the status identifier being used to support detecting a status of the first module,
    wherein:
        the status identifier is set to an activation status when the interface use status is the activation status; and
        the status identifier is set to a non-activation status when the interface use status is the non-activation status.

2. The method according to claim 1, wherein controlling the status identifier of the first storage area to correspond to the interface use status includes:
    obtaining a backup status identifier corresponding to the interface use status, the backup status identifier being located in a second storage area different from the first storage area; and
    storing the backup status identifier in the first storage area to change the status identifier of the first storage area to the backup status identifier.

3. The method according to claim 1, wherein controlling the status identifier of the first storage area to correspond to the interface use status includes:
    performing correction on the status identifier of the first storage area based on a correspondence between the interface use status and the status identifier to cause the status identifier after the correction to correspond to the interface use status.

4. The method according to claim 1, further comprising, after controlling the status identifier of the first storage area to correspond to the interface use status:
    responding to an obtained trigger signal to trigger the first module to enter a power-on time sequence control status.

5. The method according to claim 1, further comprising, before controlling the status identifier of the first storage area to correspond to the interface use status:
    matching the status identifier of the first storage area with the interface use status to obtain a matching result; and
    controlling a warning module to be in an operation status corresponding to the matching result.

6. The method according to claim 1, wherein:
    the interface of the first module includes a first type interface and a second type interface;
    the first type interface has a priority higher than a priority of the second type interface; and obtaining the interface use status of the first module includes obtaining a use status of the first type interface.

7. A method comprising:
obtaining an interface use status of a first module, the first module being electrically connected to another module via an interface, wherein obtaining the interface use status of the first module includes:
   obtaining a target signal, the target signal being an electrical signal sent by the another module through the interface of the first module;
   determining the interface use status to be an activation status in response to obtaining the target signal; and
   determining the interface use status to be a non-activation status in response to not obtaining the target signal; and
controlling a status identifier of a first storage area to correspond to the interface use status, the status identifier being used to support detecting a status of the first module.

8. The method according to claim 7, wherein controlling the status identifier of the first storage area to correspond to the interface use status includes:
obtaining a backup status identifier corresponding to the interface use status, the backup status identifier being located in a second storage area different from the first storage area; and
storing the backup status identifier in the first storage area to change the status identifier of the first storage area to the backup status identifier.

9. The method according to claim 7, wherein controlling the status identifier of the first storage area to correspond to the interface use status includes:
performing correction on the status identifier of the first storage area based on a correspondence between the interface use status and the status identifier to cause the status identifier after the correction to correspond to the interface use status.

10. The method according to claim 7, further comprising, after controlling the status identifier of the first storage area to correspond to the interface use status:
responding to an obtained trigger signal to trigger the first module to enter a power-on time sequence control status.

11. The method according to claim 7, further comprising, before controlling the status identifier of the first storage area to correspond to the interface use status:
matching the status identifier of the first storage area with the interface use status to obtain a matching result; and
controlling a warning module to be in an operation status corresponding to the matching result.

12. An electronic device comprising:
a first module electrically connected to another module via an interface of the first module; and
a second module configured to obtain an interface use status of the first module, the interface use status being one of an activation status and a non-activation status, wherein the activation status corresponds to the another module being in an available status and the non-activation status corresponds to the another module being in an unavailable status; and
the second module being further configured to control a status identifier of a first storage area to correspond to the interface use status, the status identifier being used to support detecting a status of the first module,
wherein:
the status identifier is set to an activation status when the interface use status is the activation status; and
the status identifier is set to a non-activation status when the interface use status is the non-activation status.

13. The device according to claim 12, wherein the first storage area includes:
a first sub-area configured to store the status identifier; and
a second sub-area configured to store running data of a first system, the first system being used to boot a second system to run.

14. The device according to claim 12, further comprising:
a third module electrically connected to the first module via the interface and configured to obtain data related to an operation status of the electronic device.

15. The device according to claim 12, wherein the second module is further configured to:
obtain a backup status identifier corresponding to the interface use status, the backup status identifier being located in a second storage area different from the first storage area; and
store the backup status identifier in the first storage area to change the status identifier of the first storage area to the backup status identifier.

16. The device according to claim 12, wherein the second module is further configured to:
perform correction on the status identifier of the first storage area based on a correspondence between the interface use status and the status identifier to cause the status identifier after the correction to correspond to the interface use status.

17. The device according to claim 12, wherein the second module is further configured to:
respond to an obtained trigger signal to trigger the first module to enter a power-on time sequence control status.

18. The device according to claim 12, wherein the second module is further configured to:
match the status identifier of the first storage area with the interface use status to obtain a matching result; and
control a warning module to be in an operation status corresponding to the matching result.

19. The device according to claim 12, wherein the second module is further configured to:
obtain a target signal, the target signal being an electrical signal sent by the another module through the interface of the first module;
determine the interface use status to be the activation status in response to obtaining the target signal; and
determine the interface use status to be the non-activation status in response to not obtaining the target signal.

20. The device according to claim 12, wherein:
the interface of the first module includes a first-type interface and a second-type interface;
the first type interface has a priority higher than a priority of the second type interface; and
the second module is further configured to obtain a use status of the first type interface.

* * * * *